United States Patent [19]

Nakao

[11] 4,108,269
[45] Aug. 22, 1978

[54] NO-MAN CONTROL SYSTEM FOR WORKING VEHICLES

[75] Inventor: Kiyoharu Nakao, Hiratsuka, Japan

[73] Assignee: Kabushiki Kaisha Komatsu Seisakusho, Japan

[21] Appl. No.: 796,500

[22] Filed: May 12, 1977

[30] Foreign Application Priority Data

Aug. 31, 1976 [JP] Japan .............................. 51-104543
Oct. 18, 1976 [JP] Japan .............................. 51-124531
Feb. 15, 1977 [JP] Japan .............................. 52-15423

[51] Int. Cl.$^2$ ........................................... B62D 1/28
[52] U.S. Cl. ............................................. 180/98
[58] Field of Search ........................... 180/98; 104/88

[56] References Cited

U.S. PATENT DOCUMENTS

| | | | |
|---|---|---|---|
| 3,147,817 | 9/1964 | DeLiban | 180/98 |
| 3,411,603 | 11/1968 | Kohls | 180/98 |
| 3,474,877 | 10/1969 | Wesener | 180/98 |
| 3,495,677 | 2/1970 | Wilson | 180/98 |
| 3,742,507 | 6/1973 | Pirre | 180/98 |
| 3,768,586 | 10/1973 | Thompson et al. | 180/98 |

*Primary Examiner*—Joseph F. Peters, Jr.
*Assistant Examiner*—Donn McGiehan
*Attorney, Agent, or Firm*—Ladas, Parry, Von Gehr, Goldsmith & Deschamps

[57] ABSTRACT

The control system comprises an induction cable installed along a running course between a loading station and unloading station, a detecting coil mounted on a work vehicle for detecting current flowing through the induction cable, a steering control device responsive to the output of the detecting coil for steering the vehicle to run along the running course, a vehicle position detector for detecting the vehicle reaching a predetermined position, a vehicle speed commanding device responsive to the output of the vehicle position detector for commanding acceleration and deceleration of the vehicle, and a vehicle speed control device responsive to the difference between the commanded vehicle speed and the actual vehicle speed for controlling the vehicle speed. Thus, the vehicle is controlled to run along a predetermined running course between the loading station and the unloading station.

9 Claims, 31 Drawing Figures

NO-MAN CONTROL SYSTEM FOR WORKING VEHICLES

BACKGROUND OF THE INVENTION

This invention relates to a control system of civil work vehicles for automatically running such civil work vehicles as dump trucks along a predetermined running course.

As means for conveying mined ores from an ore loading station, there to a crushing station are generally used large dump trucks having a loading capacity of from 30 to 50 tons. It has been the practice to travel between the loading station and the crushing station by manually driving the dump trucks by drivers.

However, where the field of view is narrow in night time or in mist or fog, or where there is plenty of dust or noise the drivers are obliged to work under a very difficult condition.

The manipulation of a dump truck relies upon manual operation of a hoist lever by the operator. Accordingly, if the operator manipulates the hoist lever roughly, there will occur such troubles as rupture of a seal on a hoist cylinder and damage to the dump truck due to an undue load. Actually, the hoist lever is too often manipulated extremely roughly.

Where a plurality of civil work vehicles are operated between a loading station and an unloading or crushing station, it is necessary for the drivers to keep a sufficient distance between a preceding vehicle and a succeeding vehicle for preventing collision. This requires not only a troublesome manipulation but also showing down of the running speed, thereby decreasing working efficiency.

To prevent collision there has been used a control system permitting only one vehicle to run in a predetermined running block. One such system is the ATS (automatic train stop) or ATC (automatic train control) system utilized to control railway trains. In such a system, however, it is necessary to install means for detecting the vehicle at the entrance and exit of each block. The cost of installation of such a system is extremely expensive.

SUMMARY OF THE INVENTION

It is an object of this invention to provide a no-man control system for a work vehicle wherein an induction cable is installed along a predetermined vehicle running course, a signal flowing through the induction cable is detected by a detection coil mounted on the vehicle for controlling the steering of the vehicle to cause it to run along the induction cable and wherein when the vehicle reaches a predetermined position, forward, reverse, stop and speed commanding signals are applied to the vehicle from a commanding device situated on the ground or through the induction cable thereby controlling the running of the vehicle.

Another object of this invention is to provide a no-man control system for a work vehicle such as a dump truck in which a switch back station is provided near the unloading station along a predetermined running course for efficiently unloading the vehicle.

Still another object of this invention is to provide an improved no-man control system capable of reducing time required for a vehicle to circulate through a loading station and a unloading station by controlling the speed of the vehicle thereby improving the working efficiency.

A further object of this invention is to provide a no-man control system capable of correctly detecting the deviation of the vehicle from a predetermined running course and immediately correcting such deviation.

A still further object of this invention is to provide a no-man control system capable of running a plurality of vehicles along the same running course and controlling the distance between adjacent vehicles thereby preventing collisions.

Another object of this invention is to provide a no-man control system capable of automatically actuating a retarder when a vehicle accelerates abnormally by giving a deceleration command to the retarder thus preventing abnormal over-speed and providing a constant speed of running even when the vehicle is running down a slope.

Still another object of this invention is to provide a control system capable of automatically dumping a load of a vehicle.

The invention is suitable for a dump truck which conveys such materials as ores, coal, sand, crushed stone and gravel from a loading station to an unloading station but it should be understood that the invention is also applicable to other types of vehicles conveying other types of materials or goods.

BRIEF DESCRIPTION OF THE DRAWINGS

In the accompanying drawings

DESCRIPTION OF THE PREFERRED EMBODIMENTS

Figure 1:
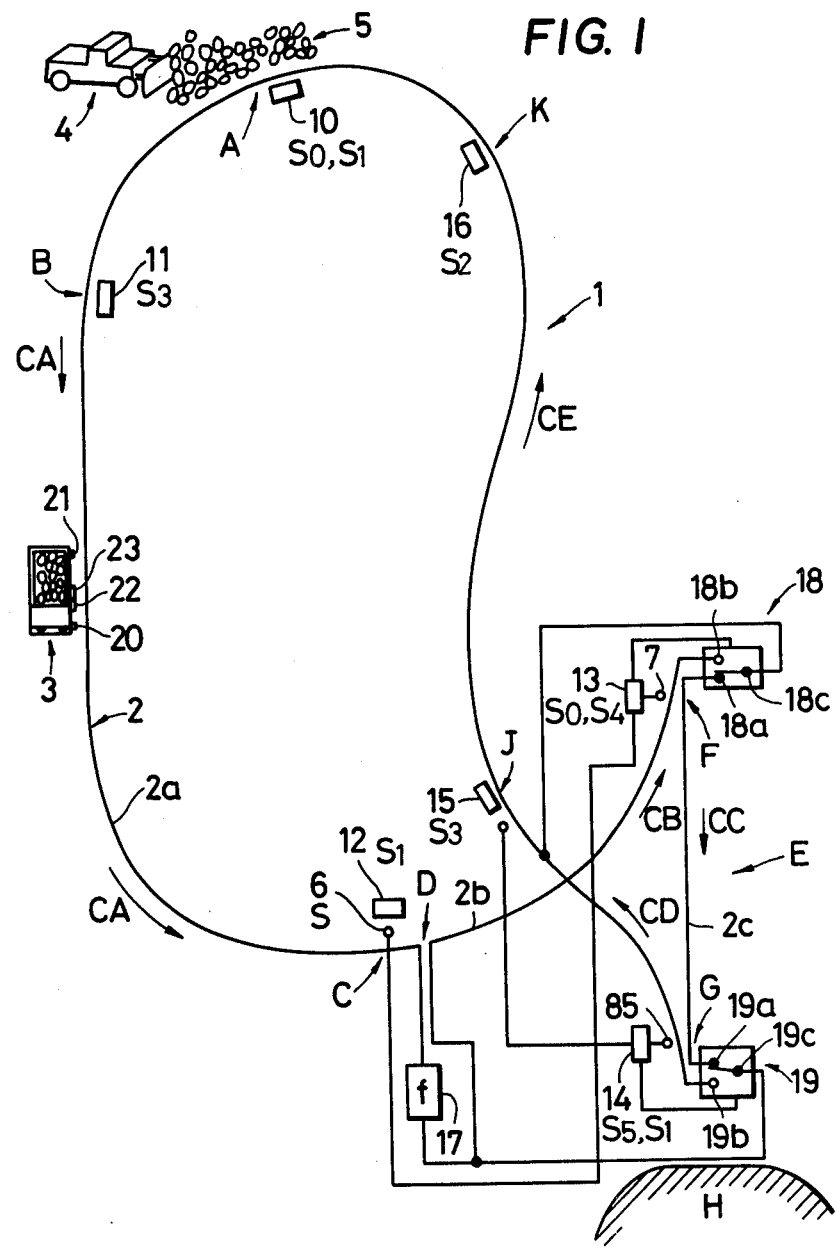
FIG. 1 is a diagrammatic representation of an automatic running course of no-man dump trucks.

In the automatic running course 1 shown in FIG. 1 each no-man dump truck is guided to circulate between one loading station A and a dumping or unloading station H via a switch back station E, and an induction cable 2 is laid along the course 1 on one side thereof. The induction cable 2 is divided into three sections 2a, 2b and 2c of which section 2a comprises a main course extending from an unloading position G to the loading station A and further to a switch point D of the switch back station E, section 2b is installed along the entrance course to the switch back station E and the section 2c is installed at the switch back station. These sections are connected to an excitation source 17 through transfer switches 18 and 19 receive induction current I having a predetermined frequency $f$. At the switch point D, the induction cable sections 2a and 2b are spaced only a little so as not to interfere with the running of the vehicle.

Vehicle detectors 6 - 9 and commanding devices 10 - 16 are installed at predetermined positions along the course 1, that is, at position C a predetermined distance ahead of the cable section 2b of the approaching course to the switch back station E, at reversing position F in the switch back station E, at unloading position G, at position J of the switch back station E, at positions B and K at predetermined distances from the loading station A, and at the loading station A.

Each one of the detectors 6 - 9 comprices a detection coil, for example, which receives a signal from an oscillator mounted at a suitable position on one side of a dump truck 3 for producing a vehicle detection signal S which is applied to commanding devices 13 and 14. Commanding devices 13 and 14 generate, in response to signals from detectors 6, 7, 8 and 9, a control signal for switching transfer switches 18 and 19, speed and dumping commands and other control signals and supply these signals to truck 3.

Commanding devices 10 - 16 are used to give speed and dumping commands etc. to truck 3 and each commanding device is provided with an oscillator producing a high speed signal $S_3$, a low speed signal $S_1$, a stop signal $S_0$, a dumping signal $S_5$, and a medium speed signal $S_2$. The commanding device 10 produces a forward low speed signal $S_1$ in addition to the stop signal $S_0$, the commanding device 13 produces a rearward or back signal $S_4$ in addition to the stop signal $S_0$, and the commanding device 14 produces a forward low speed signal $S_1$ in addition to the dumping signal $S_5$, respectively at a definite time or under a command of the operator. The signals $S_0$, $S_1$, $S_2$, $S_3$, $S_4$ and $S_5$ are distinguished from one another by using signals of predetermined different frequencies and are provided by a signal source which is independent from that of the signal for guiding the vehicle along the running course.

The dump truck 3 is provided with detection coils 20 and 21, an oscillator 22 and a receiver 23 on one side thereof. In addition, a car speed control device 24 (see FIG. 2), an automatic running control device, not shown, etc. are also mounted on the dump truck 3. The detection coils 20 and 21 are mounted on the fore and aft ends, respectively, for detecting the induction current I flowing through the induction cable sections 2a - 2c to produce signals $e_{20}$ and $e_{21}$ respectively which are applied to the automatic running control device. These signals $e_{20}$ and $e_{21}$ vary in accordance with the deviation of the vehicle from the induction cable sections 2a - 2c, that is, course 1. In response to these signals $e_{20}$ and $e_{21}$, the automatic running control device controls the dump truck 3 to run along the course 1.

Figure 2:
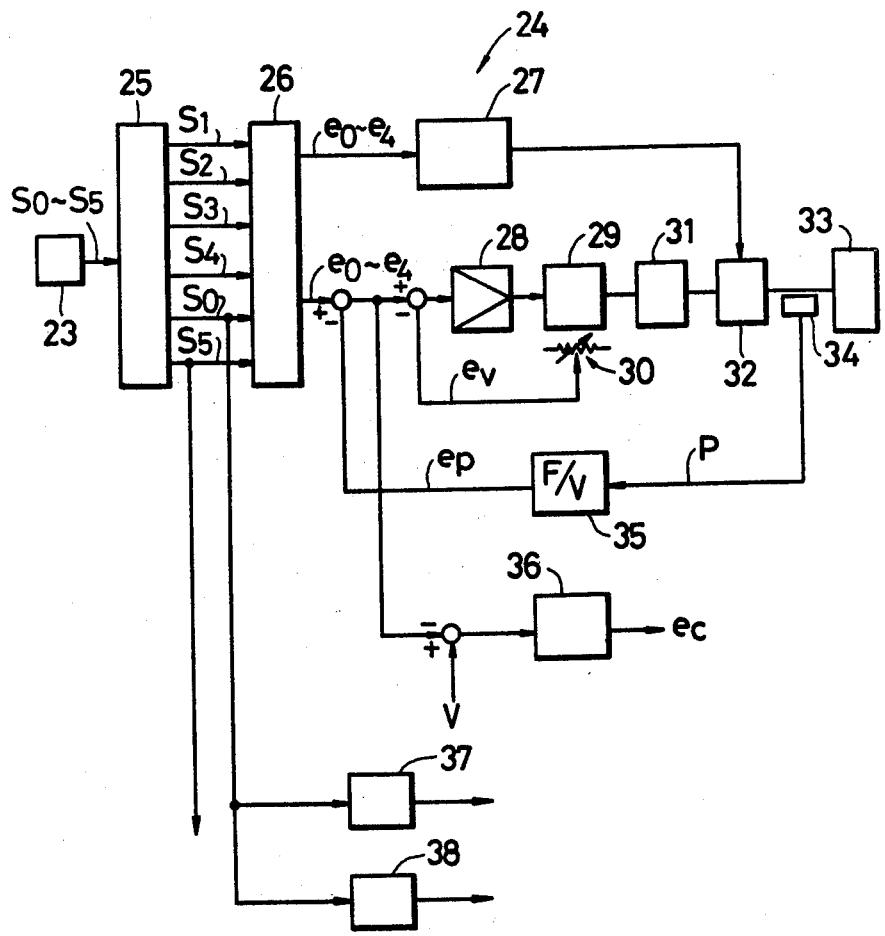
FIG. 2 is a block diagram showing one example of the vehicle control system embodying the invention.

As shown in FIG. 2 the receiver 23 on the vehicle receives and detects the commanding signals $S_0$ - $S_5$ for applying them to the selection circuit 25 of the vehicle speed control device 24. The selection circuit 25 selects the input signal for applying it to a vehicle speed designation circuit 26. The vehicle speed designation circuit 26 produces vehicle speed setting signals $e_0$ - $e_4$ corresponding to input commanding signals and applies the vehicle setting signals to an actuator 29 via a speed changer 27 and a servo-amplifier 28. In response to signals $e_1$ - $e_4$, the automatic speed changer drives transmission gearing 32 at a low speed, high speed or stops the vehicle. Further, in response to signals $e_0$ - $e_4$, the actuator 29 operates the throttle lever of a vehicle driving engine 31 for controlling the speed thereof. The actuator 29 is provided with a throttle position detector consisting, for example, of a potentiometer 30 which generates a position signal $e_v$ corresponding to the position of the throttle lever. This position signal $e_v$ is fed back to the input of the servo-amplifier 28 to act as a feedback signal. The rotation of the engine 31 is transmitted to the wheels 33 of the dump truck 3 via the transmission gearing 32 to run the truck. The vehicle speed detector 34 is mounted on the output shaft (not shown) of the transmission gearing 32 for producing a pulse signal P having a frequency corresponding to the speed of the output shaft. A frequency-voltage converter 35 (hereinafter called a F-V converter) converts the input pulse signal P into an analogue signal thereby producing a signal $e_p$ proportional to the frequency which is fed back to the input side of the servo-amplifier 28 to act as a feedback signal. In response to the differences between these signals $e_v$ and $e_p$ and the set signal $e_1$- $e_4$ the engine speed is controlled as follows: More particularly, when set vehicle speed — actual vehicle speed > 0 the throttle opening is increased to accelerate the engine, whereas when set vehicle speed — actual vehicle speed < 0 the throttle opening is decreased to apply engine braking. During deceleration, if engine braking is not sufficient, a retarder is also used. Thus, a comparator 36 produces a signal $e_c$ when vehicle set voltage $(e)$ — actual vehicle voltage $(e_v)$ + bias voltage $(v) < 0$ thereby actuating a pneumatic electromagnetic valve (not shown) to operate a retarder (not shown). The bias voltage is set to represent 3 km/h, for example.

Pneumatic electromagnetic valves 37 and 38 operate when applied with a stop signal $S_0$ from the selection circuit 25 for applying brakes to the fore and rear wheels to stop the vehicle.

When supplied with a dump commanding signal $S_5$ from the selection circuit 25, a dump control device dumps the load according to a predetermined sequence control.

It is assumed now that an empty dump truck 3 is stopping at the loading station A. At this time, the transfer switches 18 and 19 are thrown to contacts 18a and 19a respectively as shown in FIG. 1 so that the induction current I is applied to the cable section 2a. Then, the operator manually operates a loader 4 to load ore 5 on the dump truck 3. When a predetermined quantity of ore is loaded, a forward commanding signal is transmitted to the dump truck from a suitable remote control system, for example a radio control system. In response to this signal, a commanding device 10 produces a forward low speed signal $S_1$. In response to this signal, the vehicle speed designation circuit 26 produces a signal $e_1$ for running the dump truck 3 in the forward direction at a low speed, 5 km/h for example.

As the dump truck 3 passes through position B, the speed of the dump truck is increased to a higher speed, 35 km/h for example, by a high speed commanding signal transmitted from a commanding device 11.

When the dump truck 3 passes through position C, a signal S from the vehicle detector 6 is applied to a commanding device 13. In response to signal S, the commanding device 13 transfers the transfer switch 18 from contact 18a to contact 18b thereby switching the induction current I from cable section 2a to cable section 2b. At this position C the dump truck 3 is decelerated to a low speed of 5 km/h by the low speed signal $S_1$ from the commanding device 12 whereby the dump truck advances toward the switch back station E at a low speed along the induction cable section 2b. When the reverse position F is reached, the dump truck is stopped by a stop commanding signal $S_0$ from the commanding device 13. At the same time, the vehicle detector 7 produces a signal S and, in response to this signal, the commanding device transfers the transfer switch to contact 18a thereby applying the induction current I to the cable section 2c. When supplied with signal S, a timer (not shown) of the commanding device 13 operates to stop the transmission of the stop signal $S_0$ after a definite time to, for example 2 seconds, and produces a backing signal $S_4$ for a definite time, for example 4 seconds. In response to this signal $S_4$, the vehicle speed commanding circuit 26 produces a backing signal $e_4$, for controlling the dump truck 3 to rearwardly run toward dumping position G along the cable section 2c. Since the dump truck 3 passes by the commanding device 13 within a time $t_1$ it will not be stopped during the rearward running even when the commanding device 13 produces again the stop signal after 4 seconds.

When the dump truck 3 has reached the dumping position G and received a dumping signal $S_5$ from the commanding device 13, the dump truck stops thereat and then begins a dumping operation to unload the ore 5 onto the unloading station or hopper H. The reason why the commanding device 14 produces a dumping signal but not a stop signal is that so long as the vehicle is constructed to stop when it receives a dumping signal it is not necessary to purposely produce a stop signal so that it is possible to eliminate provision of a particular frequency therefor and a transfer circuit. On the other hand, the vehicle detector 8 produces a signal S and applies it to the commanding device 14. When this signal is applied to the commanding device 14, its transfer switch 19 immediately transfers to contact 19b thereby applying the induction current I to the cable section 2a. After time $t_2$, for example 9 seconds, subsequent to the application of signal S, the commanding device 14 stops generation of the dumping commanding signal $S_5$ but instead produces a forward low speed signal $S_1$ after a time $t_3$, for example 25 seconds. If the dumping operation has not been completed by the time when signal $S_1$ is produced, the situation is extremely dangerous. To prevent such danger, a mask circuit is provided to prevent starting of the dump truck for a time $t_4$ for example 5 seconds, after returning of the vessel of the vehicle to the original position even if the signal $S_1$ is received. Upon the lapse of 5 seconds after completion of the dumping operation, the dump truck is caused to run in the forward direction at a speed of 5 km/h in response to the low speed signal $S_1$ from the commanding device 14, thus leaving the switch back station E.

When the dump truck 3 passes through position J the signal S from the vehicle detector 9 is applied to the commanding device 14 which in response to this signal transfers transfer switch 19 to contact 19a. At this position J the dump truck 3 is accelerated to a high speed of 35 km/h by the high speed signal $S_3$ from the commanding device 15, and runs toward the loading station.

When the dump truck passes through position K preceding the loading station A, it is decelerated to a medium speed, for example 15 km/h by the medium speed commanding signal $S_2$ from the commanding device 16. When the dump truck reaches the loading station A, it is stopped thereat by the stop commanding signal $S_0$ from the commanding device 10. As above described, the dump truck is controlled to reciprocate between the loading station A and the unloading station H for conveying the ore 5.

In the foregoing embodiment, the flow of the induction current through predetermined sections of an induction cable is switched by transfer switches, and speed commanding signals are sent to a vehicle from commanding devices installed at predetermined positions on the ground along the running course of the vehicle for the purpose of controlling the running of the vehicle. In a modified embodiment shown in FIGS. 3 through 18, a plurality of loops of an induction cable is installed along the running course of the vehicle, currents having different frequencies are passed through respective cable loops for the purpose of successively using different currents thereby controlling the forward and reverse runnings, stop, high and low speed runnings as well as the dumping operation of the vehicle.

More particularly, in the embodiment shown in FIG. 3, the running course 1 extends between an ore loading station A and an unloading station H (hereinafter termed a hopper) via a switch back station E and induction cable sections $C_1$ - $C_4$ are installed along and on the outside of the running course 1 and at the switch back station E. By installing the induction cable on the outside of the running course there is no danger of damaging the cable when the dump truck 3 runs. Moreover, the installation of the induction cable can be greatly facilitated. Respective induction cable sections $C_1 - C_4$ are impressed with high frequency currents having predetermined frequencies $f_1$ through $f_4$, respectively. Since the induction cable sections $C_1 - C_4$ are disposed to cross the running course at a plurality of points at the switch back station E, it is advantageous to bury the cable sections by a predetermined depth near the switch back station E as shown by dotted lines to prevent damage which could be caused by the running of the dump truck 3.

Figure 4:
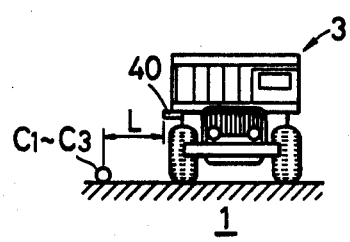
FIGS. 4 and 5 are front and plan views respectively of a dump truck showing the relationship between induction cable sections and detection coils mounted on one side of the dump truck.
Figure 5:
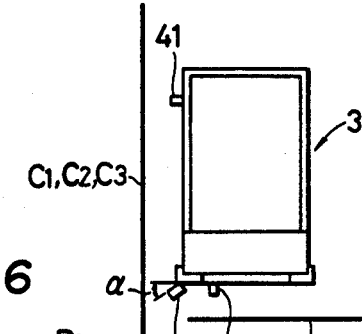

The dump truck 3 advances to a position $P_1$ of the switch back station E from the loading station A as shown by an arrow CA, then runs in the reverse direction from position $P_1$ to position $P_2$ as shown by an arrow CE and dumps its load into hopper H. After dumping, the dump truck again runs in the forward direction from position $P_2$ toward the loading station as shown by an arrow CD. As shown in FIGS. 4 and 5, detection coils 40, 41 and 42 are mounted on the side of the dump truck 3 facing the induction cable sections $C_1$, $C_2$ and $C_3$. The detection coil 40 is mounted on the front end of one side of the car body facing the induction cable at an inclination angle $\alpha$ with respect to the induction cable for the purpose of improving the steering characteristic along curves of the running course. Angle $\alpha$ is set such that, along a curve having a minimum radius of curvature, the detection direction of the coil will be perpendicular to the induction cable. On the other hand, the detection coil 41 is disposed perpendicular to the car body such that its direction of detection will be perpendicular to the induction cable when the dump truck runs along straight portions of the running course. Detection coils 40 and 41 cooperate to control the steering of the dump truck when it runs in the reverse direction. Detection coil 42 is mounted such that its direction of detection will be perpendicular to the portions $C_{4a} - C_{4c}$ of the cable section 4c which are installed at right angles with respect to the running course at the switch back station E. The detection coils 40 and 41 detect signals having frequencies $f_1 - f_3$ and flowing through induction cable sections $C_1 - C_3$, whereas the detection coil 42 detects a signal having a frequency of $f_4$ and flowing through cable section $C_4$.

Figure 6:
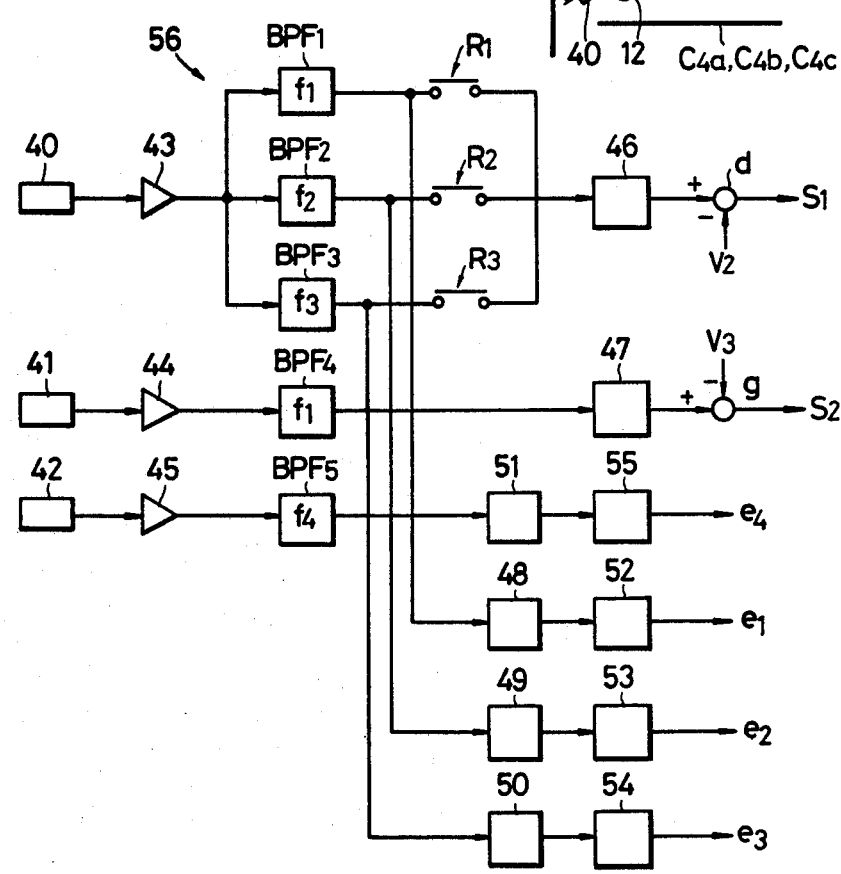
FIG. 6 is a block diagram showing a detection device.
Figure 8:
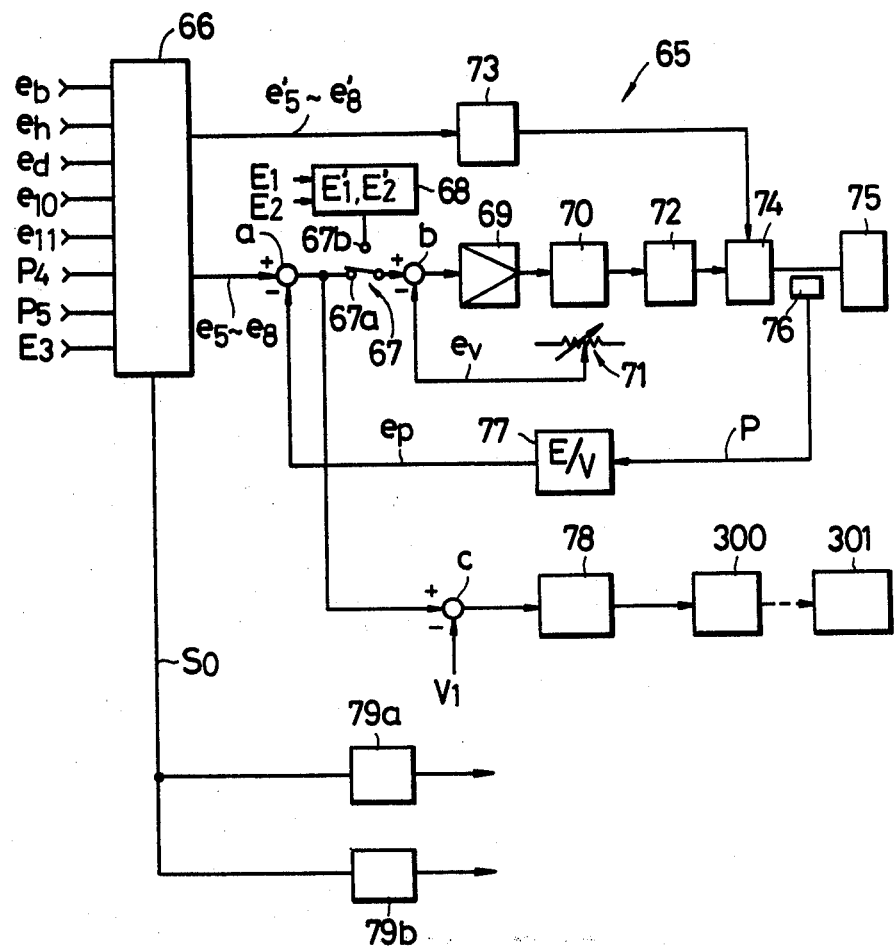
FIG. 8 is a block diagram showing a constant speed running control device.
Figure 9:
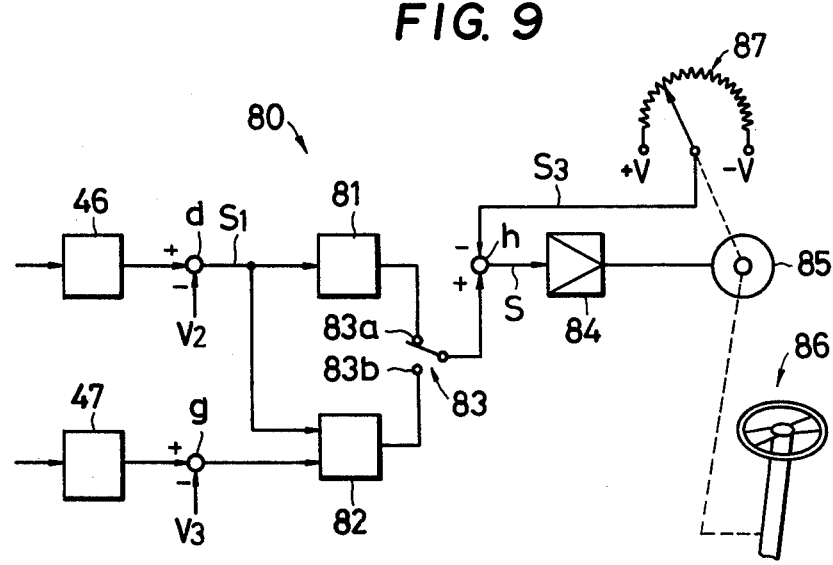
FIG. 9 is a block diagram showing a steering control device.
Figure 10:
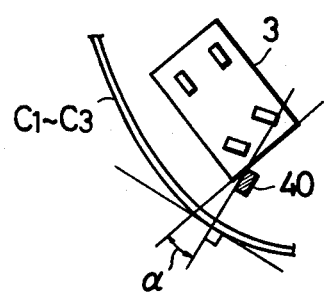
FIGS. 10 and 11 are diagrams showing manners of running a vehicle along a curve on the inside and outside thereof respectively.

Assume now that after being loaded with ore 111 (FIG. 18) at the loading station A (FIG. 3), the dump truck 3 runs toward the switch back station E along the running course 1 in the direction of arrow CA. At this time, flip-flop circuits $FF_1$ through $FF_5$ of a running control circuit 60 shown in FIG. 5 are all reset, and an AND gate circuit $A_1$ produces an output "0" so that relay $RY_1$ is ON and relays $RY_2$ and $RY_3$ are OFF. It is to be understood that these relays $RY_1 - RY_3$ are turned ON when they are supplied with "0" inputs whereas they are turned OFF when supplied with "1" inputs. Accordingly, the relay contact $R_1$ of the detection device 56 shown in FIG. 6 is ON and the relay contacts $R_2$ and $R_3$ are OFF. The detection circuit 56 and the running control circuit 60 are mounted on the dump truck 3. The flip-flop circuit $FF_5$ produces a high speed commanding signal $e_h = $ "1" which is applied to the vehicle speed designation circuit 66 of a constant speed running control device 61 (FIG. 8).

The vehicle speed designation circuit 66 outputs vehicle speed set signals, for example a low speed signal $e_5$, a high speed signal $e_6$, a stop signal $e_7$, a reverse signal $e_8$, and signals $e_{5'} - e_{8'}$ corresponding to signal $e_5 - e_8$ in response to a back commanding signal $e_b'$ a high speed commanding signal signal $e_n$ and a dumping commanding signal $e_d$ produced by a running control circuit 60. Signals $e_5 - e_8$ are applied to an actuator 70 via a transfer switch 67 and an amplifier 69 whereas signals $e_{5'} - e_{8'}$ are applied to an automatic speed changer control device 73.

Transfer switch 67 is normally in contact with contact 67a but thrown to contact 67b when dumping commanding signal $e_d$ is produced. When supplied with engine speed commanding signals $E_1$ and $E_2$ which are produced during the dumping operation as will be described later, an engine speed setter 68 produces corresponding set signals $E_1'$, and $E_2'$ which are applied to the contact 67b of the transfer switch 67.

Figure 28:
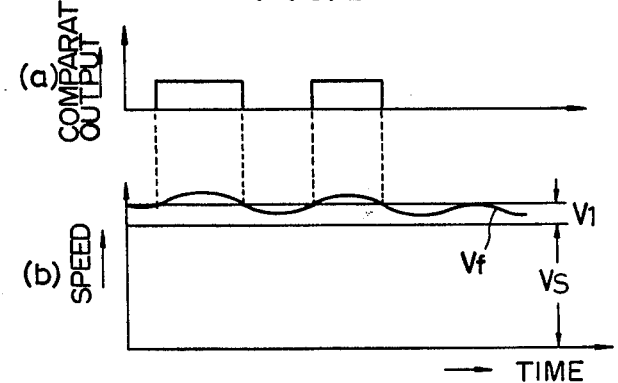

In response to signals $e_{5'} - e_{8'}$, the automatic speed changer control device 73 switches the operation of an automatic speed changer 74 to a high speed, stop and reverse positions, etc., while the actuator 70 controls the rotation of the engine 72 by driving a throttle lever in response to signals $e_5 - e_8$. A throttle position detector, for example a potentiometer, is provided for the actuator for producing position signal $e_v$ corresponding to the throttle position, the position signal $e_v$ being fed back to the input side of a servo-amplifier 69 to act as a feedback signal. The rotation of the engine 72 is transmitted to the wheels 75 of the vehicle via the automatic speed changer 74 to run the dump truck. A vehicle speed detector 76 is mounted on the output shaft of the speed changer 74 for producing a pulse signal P having a frequency proportional to the speed of the output shaft. A frequency-voltage converter 77 (hereinafter termed an F - V converter) converts the input pulse signal P into an analogue signal to produce a signal $e_p$ proportional to the frequency which is fed back to the input side of the servo-amplifier 69 to act as a feedback signal. The differences between these signals $e_v$ and $e_p$ and the set signals $e_5 - e_8$ are used in the following manner. When set vehicle speed — actual vehicle speed > 0 the opening of the throttle valve is increased to accelerate the vehicle, and when set vehicle speed — actuator speed < 0 the opening of the throttle valve is decreased to apply engine braking. During deceleration, when the engine braking alone is not sufficient to decelerate the vehicle, a retarder is also used. More particularly, a comparator 78 produces a signal $e_c$ when vehicle set voltage — actual speed $e_v$ + reference voltage $V_1 < 0$ Signal $e_c$ is used to operate an actuator 300 for actuating a retarder 301 which applies a braking force to the wheels 75. The reference voltage $V_1$ is set to correspond to 3 km/h, for example. Consequently, when the set vehicle speed $V_5$ is 30 km/h, and if the reference voltage $V_1$ corresponds to 3 km/h, the comparator 78 produces an output shown in FIG. 28a when the actual vehicle speed $V_s$ exceeds $V_1$ when the vehicle is descending a slope thereby applying a driving signal to the actuator 301 with the result that the retarder 301 operates to brake the vehicle to restrict its speed below 33 km/h.

Pneumatic electromagnetic valves 79a and 79b are energized by a stop signal $S_0$ from the vehicle speed designation circuit 66 to operate the fore and aft brakes not shown for stopping the vehicle.

The constant speed running control device 65 drives the dump truck at a predetermined constant high speed, for example 35 km/h, in accordance with the high speed commanding signal $e_h$.

As shown in FIG. 6, the detection device 40 detects the signal $f_1$ and applies the detected signal to bandpass filters $BPF_1$ - $BPF_3$ via an amplifier 43 of the detection device 56. Thus, filters are designed to pass only predetermined signals $f_1$, $f_2$ and $f_3$ respectively. There are also provided bandpass filters $BPF_4$ and $BPF_5$ which pass signals $f_1$ and $f_2$ respectively. The signal $f_1$ passing through the bandpass filter $BP_1$ is applied to a rectifier 48 and to a detector 46 via relay contact $R_1$. The detector 46 detects signals $f_1$, $f_2$ and $f_3$ and applies the detected signals to an adder d.

The detection coil 41 also detects signal $f_1$ and applies the detected signal to a detector 47 via an amplifier 44 and the band pass filter $BPF_4$. The signal $f_1$ detected by the detector 47 is applied to an adder g. Adders d and g are supplied with bias voltage $V_2$ and $V_3$ respectively. The values of the bias voltages $V_2$ and $V_3$ are set such that when the dump truck runs along a predetermined course as shown in FIG. 4, and when the spacings between the induction cable sections $C_1$-$C_3$ and the detection coils 40 and 41 are equal to a predetermined spacing L, the difference between these bias voltages and the outputs of the detector 46 and 47 will be zero. When the dump truck 3 deviates from the predetermined running course, the differences $S_1$ and $S_2$ between the outputs of the detection coils 46 and 47 and the bias voltages $V_2$ and $V_3$ are applied to compensation circuits 81 and 82 of the steering control device 80 shown in FIG. 9. The compensation circuit 81 acts as a steering stabilizer when the dump truck 3 runs in the forward direction and produces a signal corresponding to the input signal $S_1$ which is applied to contacts 83a of a transfer switch 83. The compensator 82 acts as a steering stabilizer during reverse running and detects an attitude angle of the dump truck while it runs in the reverse direction in response to the difference between signals $S_1$ and $S_2$. The output produced by the compensator 82 is applied to contact 83b of the transfer switch 83 which is thrown to contact 83a during forward running but to contact 83b during reverse running.

A potentiometer 87 driven by a steering servo-motor 85 produces a feedback signal $S_3$ applied to an adder h which applies a difference signal S to a servo-amplifier 84. In response to the output signal from the servo-amplifier 84, the servo-motor 85 automatically steers the steering handle 86 of the dump truck 3 thus correcting the off course running thereof to run it along the predetermined running course. The direction and amount of the correction of the steering handle are controlled to reduce said difference signal to zero. The servo-motor 85 is driven until the input difference signal becomes zero thus steering the steering handle 86.

Figure 11:
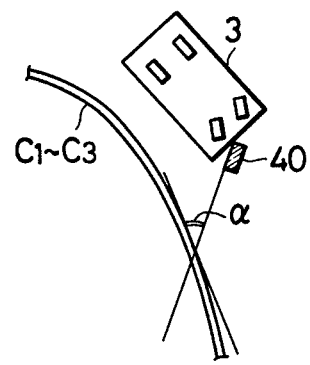

As above described, the off course running of the dump truck 3 is detected to automatically steer the same to run along the predetermined running course.

Where the dump truck 3 runs along the inside of a curve of the running course having a predetermined radius of curvature, the detection coil 40 mounted on the front side of the vehicle body at an inclination angle of α detects the position of the curve before the dump truck reaches the curve. Due to the inclination angle α, the detection coil 40 gradually becomes perpendicular to cable sections $C_1$-$C_3$ from the starting point of the curve. For this reason, before the dump truck reaches the curve, steering is corrected beforehand. In this manner, when the dump truck is running along a curve, the output voltage of the detection coil 40 increases gradually from the starting point of the curves until detection coil becomes perpendicular to the induction cable sections $C_1$-$C_3$. This output voltage reaches a maximum at the perpendicular position and then gradually decreases toward an end point of the curve. Accordingly, the steering handle is gradually corrected at the starting point of the curve but corrected to a maximum extent at the perpendicular position. Thereafter, the correction is gradually decreased toward the end point of the curve. Before the dump truck enters the straight portion of the running course from the end point of the curve, detection coil 40 detects such condition, thus gradually returning the steering handle 86. Consequently, the dump truck 3 can smoothly transit from the straight position to the curve portion and from the curved portion to the straight portion of the running course.

Where the dump truck runs on the outside of a curve as shown in FIG. 11, the detection coil 40 mounted on the front side of the car body at an inclination angle of α detects the curve before the dump truck reaches the curve so that the steering operation of the steering handle 86 is gradually corrected beforehand thereby smoothly running the dump truck 3 along the curve. At the curve, the output of the detector coil decreases more greatly than in a course where the truck runs along the straight portion. The amount of reduction of the output is small at the starting point of the curve but increases gradually and reaches a maximum at a point where the angle of the detection coil 40 is the largest relative to a hypothetical position at which the detection coil 40 intersects the induction cable sections $C_1$-$C_3$ at right angles. Thereafter the amount of reduction of the output decreases gradually at a point immediately before transition from the curve to the straight portion. For this reason, by the change in the induced voltage the steering handle is corrected beforehand to control the dump truck to smoothly run along the curve and to smoothly transit from the curve to the straight portion.

Figure 7:
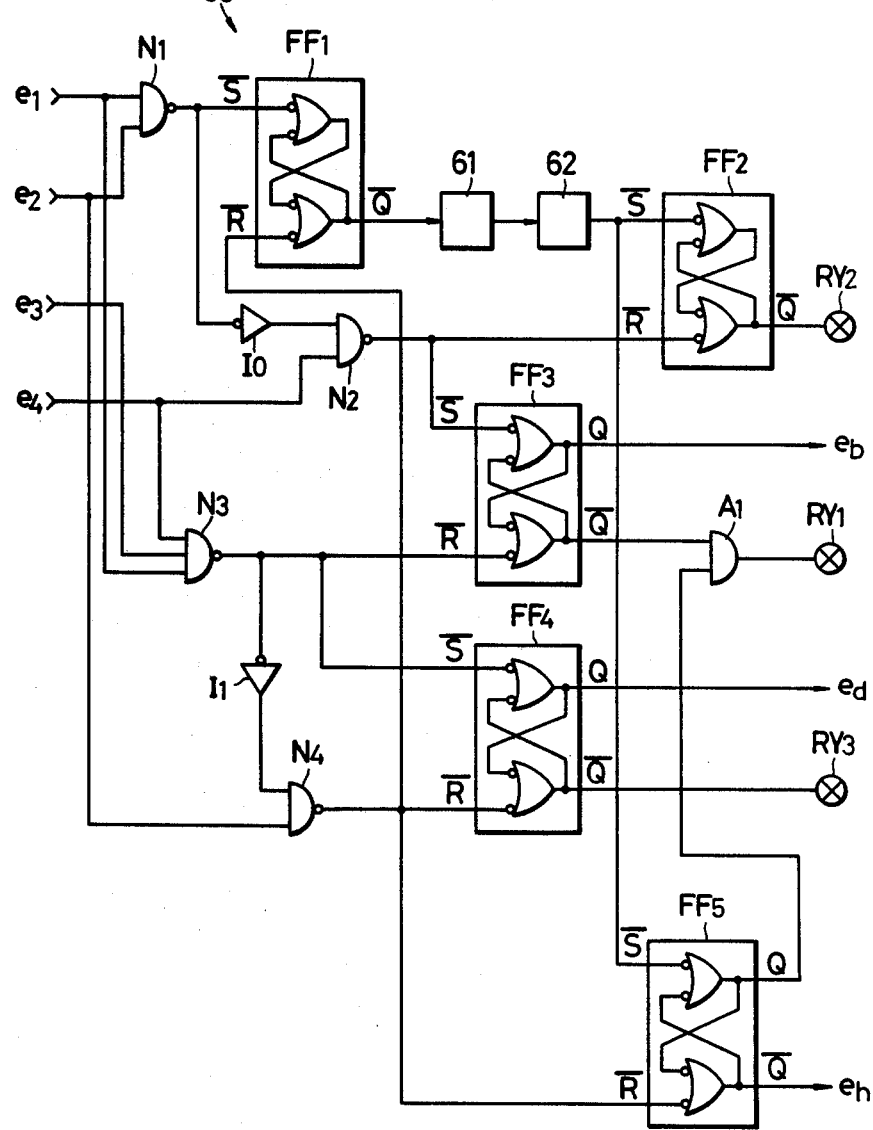
FIG. 7 is a block diagram showing a running control circuit.

Rectifier 48 rectifies the input signal $f_1$ and applies the rectified signal to the comparator 52 which produces an output signal $e_1 =$ "1" in response to the rectified signal. In the same manner, rectifiers 49, 50 and 51 rectify input signals $f_2$, $f_3$ and $f_4$ respectively and apply the rectified signals to comparators 53, 54 and 55, which produce signals $e_2 =$ "1", $e_3 =$ "1" and $e_4 =$ "1" respectively in response to the rectified signals. These signals are applied to the running control circuit 60 as shown in FIG. 7.

As the dump truck 3 reaches the entrance D of the switch back station E, the detection coil 40 detects signal $f_2$ in addition to signal $f_1$ whereby comparator 53 produces a signal $e_2 = 1$ and a NAND gate circuit $N_1$ of the control circuit 60 (see FIG. 7) produces an output "0" to set a flip-flop circuit $FF_1$. Accordingly, its Q output changes to "1" from "0". A differentiation circuit 61 produces a trigger pulse when its input signal changes to "0" from "1" and the trigger pulse is applied to a timer circuit 62 which when supplied with the trigger pulse operates for about two seconds during which signal "1" is produced. A flip-flop circuit $FF_2$ is set at the fall portion of this signal "1" whereby relay $RY_2$ is energized to turn ON the relay contact $R_2$ of the detection device 56. At the same time, a flip-flop circuit $FF_5$ is set and the output of an AND gate circuit $A_1$ becomes "1" to deenergize relay $RY_1$. Accordingly, contact $R_1$ is turned OFF. Thus, signal $f_2$ is applied to the detector 46 via contact $R_2$. Two seconds after generation of signal $e_2 = $ "1" the steering of the dump truck 3 is controlled by the signal $f_2$ to run it to position $P_1$ of the switch back station E. At the same time, the high speed commanding signal $e_h$ becomes "0" so that the constant speed running control device 65 controls the dump truck 3 to run at a predetermined low speed, for example 5 km/h.

When the dump truck 3 advances to position $P_1$ the detection coils 40 and 41 detect signals $f_1$ and $f_2$ and the detection coil 42 detects signal $f_4$ thereby producing a signals
$e_1 = $ "1", $e_2 = $ "1" and $e_4 = $ "1". Accordingly, the output of a NAND gate circuit $N_2$ becomes "0" whereby flip-flop circuit $FF_2$ is reset and relay $RY_2$ is deenergized. At the same time, flip-flop circuit $FF_3$ is set and relay $RY_1$ is energized. Concurrently therewith a back commanding signal $e_h = 1$ is produced and applied to the constant speed running control device 65. In response to signal $e_b$ the control device 65 stops the dump truck 3 and then moves it in the reverse direction. During the reverse running detection coils 40 and 41 detect signals $f_1$ so that signals $S_1$ and $S_2$ are applied to a compensation circuit 82. During the reverse running the transfer switch 83 is switched to contact 83b as above described, so that the difference between signals $S_1$ and $S_3$ is applied to adder $h_1$ and a difference S between the feedback signal $S_3$ from poentiometer 87 and the difference signal between signals $S_1$ and $S_2$ is applied to the servo-amplifier 84. The servo-motor 85 controls the steering such that the signal S becomes "0". For this reason, the dump truck 3 runs in the reverse direction toward position $P_2$ on the straight portion of the switch back station along the induction cable section $C_4$.

When the dump truck 3 reaches position $P_2$, the detection coil 42 detects signal $f_4$. Also the detection coil 40 detects signal $f_3$ in addition to signal $f_1$ so that signals $e_1 = $ "1", $e_2 = $ "1" and $e_4 = 1$ are porduced. As a consequence, the output of the NAND gate circuit $N_3$ becomes "0" to reset the flip-flop circuit $FF_3$. As a consequence, signal $e_b$ becomes "0" to eliminate the back commanding signal and to deenergize relay $RY_1$. At the same time, the flip-flop circuit $FF_4$ is set to produce a dumping operation commanding signal $e_d = $ "1". In response to this signal $e_d = 1$, the constant speed running control device 65 stops the dump truck at position $P_2$. In addition, relay $RY_3$ is also energized, and as above described, the transfer switch 67 is switched to contact 67b.

Figure 12:
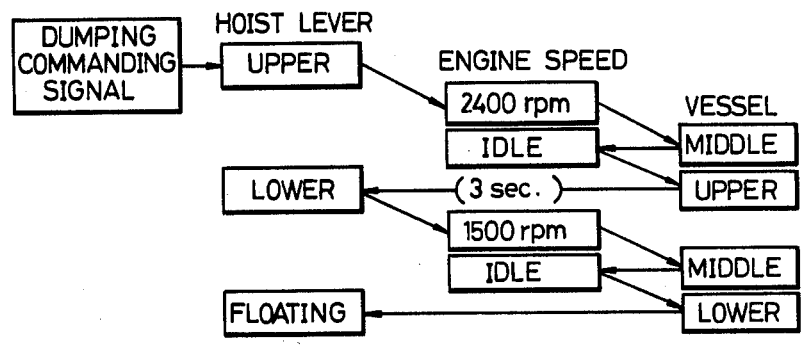
FIG. 12 is a flow diagram showing an automatic dumping sequence.

As shown in FIG. 12, the automatic dumping system is constructed such that, when a dumping commanding signal is applied, a hoist lever is set to an "upper" position to increase the engine speed to a predetermined number of rotations, for example 2400 RPM, thereby raising the vessel. When the vessel is raised to a "middle" position, the speed of the engine is returned to idling. Thereafter, the vessel rises to the "upper" position by its own weight. During the upward motion to the "upper" position, the load is gradually discharged. The vessel is stopped at the "upper" position for a definite time, three seconds for example, to completely discharge the load. Three seconds later, the hoist lever is set to the "lower" position to increase the speed to 1500 RPM, for example, the vessel is lowered to the "middle" position. After the vessel has been lowered to the middle position, the speed of the engine is returned to idling. Thereafter, the vessel lowers to the "lower" position by its own weight. When the vessel completely returns to the "lower" position, the hoist lever will be set to a "floating" position. The automatic dumping operation is controlled as above described.

Figure 13:
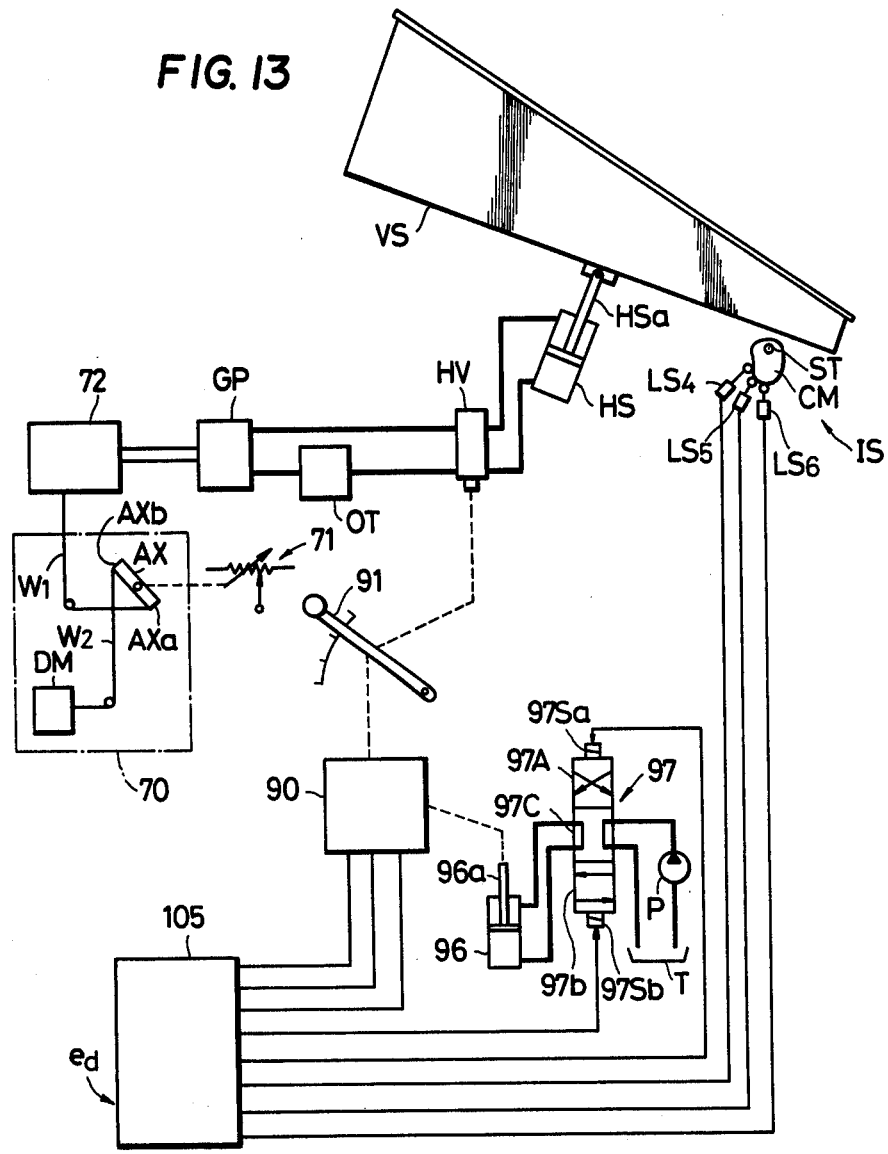
FIG. 13 is a block diagram showing one example of an automatic dumping control device.

FIG. 13 shows one example of the automatic dumping control device in which the acceleration pedal AX of the actuator 70 is rotatably mounted on a pin. One end AXa of the acceleration pedal AX is connected to the throttle lever, not shown, of the engine 72 through a wire $W_1$ while the other end AXb is connected to a drum, not shown, driven by a DC motor DM via a wire $W_2$. The wire $W_2$ is fed out or taken up such that when the motor rotates in the forward direction acceleration pedal AX is brought to the depressed state or the throttle opening is increased whereas when the motor rotates in the opposite direction the throttle opening is decreased. An engine 72 is connected to drive a gear pump GP via a drive shaft. The gear pump GP supplies operating oil to a hoist cylinder HS from an oil tank OT via a hoist valve HV, so as to operate the hoist cylinder HS in accordance with the switching position of the hoist valve HV. The lower end of the vessel VS is rotatably supported by a shaft ST. The piston rod HSa of the hoist cylinder HS is pivotally connected to a center portion of the lower surface of the vessel VS by a pin. It is also possible to arrange the hoist cylinder HS at a desired position of the vehicle body of the dump track, not shown. Accordingly, the vessel VS is rotated in the vertical direction as the piston rod HSa is extended or retracted. The hoist valve HV is connected to the hoist lever 91 through a suitable connecting member. The hoist lever 91 is connected to a hoist lever positioning control device 90. Signals produced in the control device 90 at various position of the hoist lever 91 and the signals produced at various positions of the vessel position detection device IS are applied to the automatic dumping control device 105 so as to effect the automatic dumping operation as will be described later.

Figure 14:
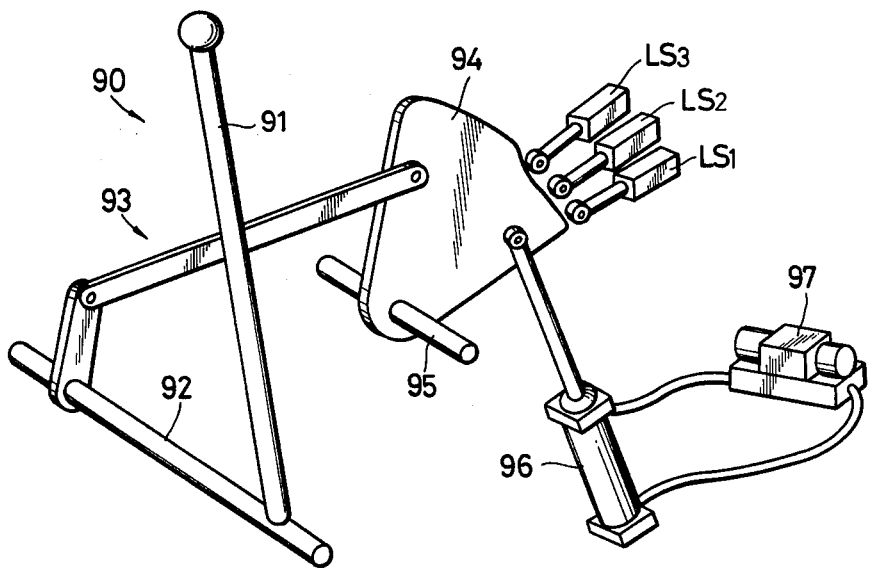
FIG. 14 is a perspective view showing a hoist lever and limit switches operated thereby.

The hoist positioning control device 90 is constructed as shown in FIG. 14 for example. The hoist lever 91 has four switching positions "upper" "hold," lower" and "floating".

Although it is desirable that the hoist lever can be set at respective positions, minimum necessary positions are "upper", "lower" and "floating". Similar to the automatic dumping control device (FIG. 12), the lever 61 is moved sequentially in the order of "upper" "lower" "floating". The position "hold" is used for the manual operation.

A cam 94 is rotatably mounted on shaft 95 and connected to shaft 92 of the hoist lever 91 through a link mechanism. Furthermore, the cam 94 is connected to an oil pressure cylinder 96 for causing the lever to be controlled by an electromagnetic valve 97. Consequently, when the electromagnetic valve 97 is actuated the hoist lever 91 can be set to one of the upper, lower and floating positions described above. Limit switches $LS_1$ - $SL_3$ are provided for controlling the position of the hoist lever 91 at positions opposing cam 94. These limit switches comprise break contacts and are controlled by the cam 94. When the hoist lever 91 is at the "upper" position, limit switches $LS_1$ - $LS_3$ are OFF, while the hoist lever is at the lower position, limit switch $LS_1$ is ON, $LS_2$ and $LS_3$ are OFF, whereas at the floating position, limit switches $LS_1$ - $LS_3$ are ON.

As shown in FIG. 13, the vessel position detection device IS is provided with a cam CM at the position of a hinge pin ST at the bottom of the vessel VS, and limit switches $LS_4$ - $LS_6$ are arranged to be operated by cam CM. These limit switches are used to detect the position of the vessel. When the vessel is at the "upper" position, limit switches $LS_4 - LS_6$ are opened and at the "middle" position $LS_4$ is closed while $LS_5$ and $LS_6$ are opened. At the "lower" position, all limit switches are closed. These limit switches comprise break contacts.

Figure 15:
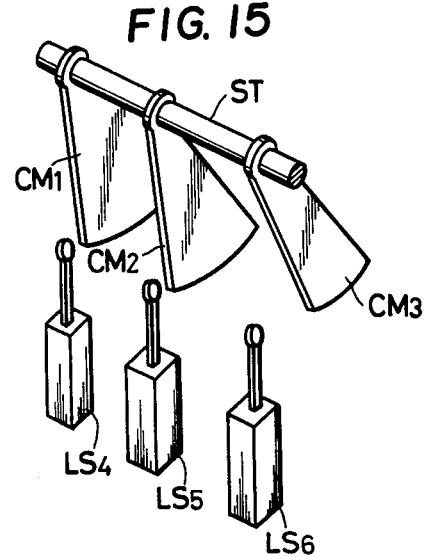
FIG. 15 shows another example of the vessel position detection device.
Figure 16:
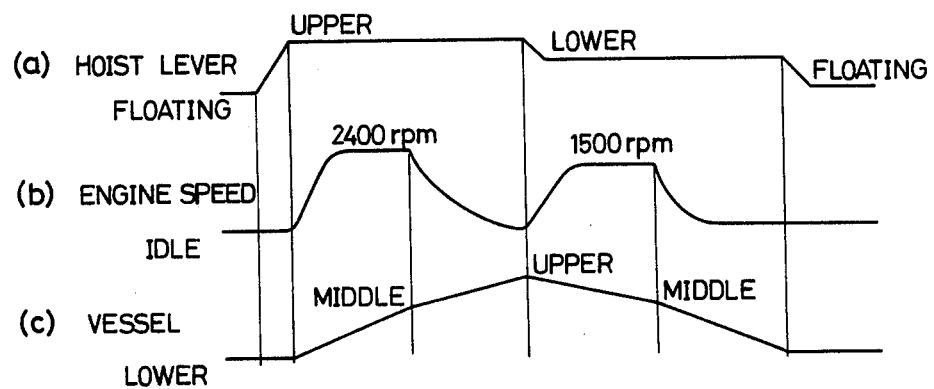
FIG. 16 is a timing chart showing the operation of the hoist lever, engine speed and the position of the vessel of a dump truck.

FIG. 15 illustrates another example of the vessel position detection device in which three cams $CM_1 - CM_3$ are mounted on the hinge pin ST to operate limit switches $LS_4 - LS_6$ respectively. The ON and OFF operations of the limit switches are the same as above described.

Referring again to FIG. 13, cylinder 96 is connected to an oil pressure pump P and the oil tank T via a transfer electromagnetic valve 97 which is moved to position 97A when a solenoid coil 97Sa is energized but transferred to position 97B when a solenoid coil 97Sb is energized thereby extending and retracting the piston rod 96a. Where none of the solenoid coils 97Sa and 97Sb is energized, the transfer electromagnetic valve 97 is maintained at the neutral position.

Figure 17:
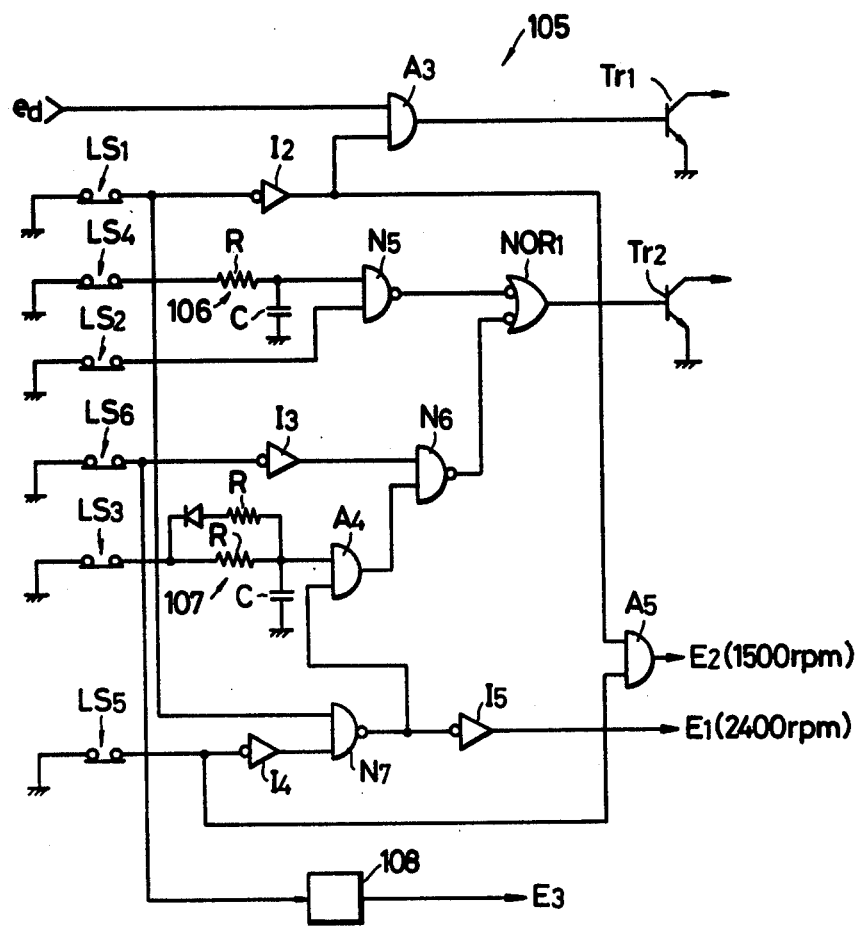
FIG. 17 is a block diagram showing an automatic dumping controlling circuit.

As above described, when the dump truck 3 stops at position P2 of the switch back station E, a dumping commanding signal $e_d =$ "1" is applied to one input of an AND gate circuit $A_3$ of the automatic dumping controlling circuit 105 shown in FIG. 17. At this time, all limit switches $LS_1 - LS_6$ are ON and the engine is idling. Since the limit switch $LS_1$ is ON, it applies signal "1" to the other input of the AND gate circuit $A_3$ through an inverter $I_2$. Consequently, the AND gate circuit $A_3$ is enabled to produce a signal "1" which turns ON a transistor $Tr_1$ for driving the electromagnetic valve 97 to switch it to position 97A, that is to the lever raising position, thereby setting the hoist lever to the upper position. Then, limit switches $LS_1 - LS_3$ are turned OFF to switch the valve 97 to the neutral position thus holding the hoist lever at the upper position. At the same time signal "1" is applied to one input of a NAND gate circuit $N_7$. Since signal "1" is also applied to the other input of the NAND gate circuit $N_7$ it is enabled to produce an output "0" which is used to produce a signal $E_1 = 1$ via an inverter $I_5$. In response to this output the engine speed setter 68 (FIG. 8) produces a corresponding signal $E_1'$ which is applied to contact 67b. In response to signal $E_1'$ the control device 65 increases the speed to 2400 RPM (FIG. 16b) thereby driving gear pump GP to raise the vessel VS (FIG. 13).

When the vessel VS is raised to the "middle" position, limit switches $LS_5$ and $LS_6$ are turned OFF and signal $E_1$ becomes "0". Consequently, the engine is returned to idling. Therefore, vessel VS rises to the "upper" position by its own weight (FIG. 16c). During this rising of the vessel, the load therein begins to fall into the hopper H. As the vessel rises to the "upper" position, the limit switch $LS_4$ is turned OFF. A delay circuit 106 holds signal "0" for a definite time (3 seconds) after limit switch $LS_4$ has been turned OFF and then applies signal "1" to one input of a NAND gate circuit $N_5$. While the vessel VS is maintained at the "upper" position, all the load falls down. Since the other input of the NAND gate circuit $N_5$ is supplied with signal "1" because limit switch $LS_2$ has been turned OFF, the NAND gate circuit $N_5$ is enabled to apply signal "0" to one input of a NOR gate circuit $NOR_1$. Since the other input of the NOR gate circuit $NOR_1$ is supplied with signal "1" from NAND gate circuit $N_6$, the NOR gate circuit $NOR_1$ produces signal "1" which turns transistor $Tr_2$ ON for driving the electromagnetic valve 97. Consequently, solenoid coil 97Sb is energized to switch the electromagnetic valve to position 97B to set the hoist lever 91 at the lower position. Then, limit switch $LS_1$ is turned ON to apply signal "1" to one input of AND gate circuit $A_5$ via an inverter $I_2$. Since the limit switch $LS_5$ is opened, signal "1" is applied to the other input of the AND gate circuit $A_5$. Consequently, this AND gate circuit $A_4$ is enabled to produce a signal $E_2 =$ "1". In response to this signal, the engine speed setter 68 produces a corresponding signal $E_2'$ which is applied to the contact 67b of the transfer switch 67. In response to this signal $E_2'$ the control device 65 increases the engine speed to 1500 RPM (FIG. 16b) thus lowering the vessel VS from the "upper" position to the "middle" position. Engine speed of 1500 RPM is selected to apply oil pressure to the hoist cylinder HS for driving the vessel for the purpose of passing the hoist cylinder through the upper dead center.

When the vessel VS descends to the middle position, limit switch $LS_4$ is closed to cause the NAND gate circuit $N_5$ to produce output "1". Consequently, the output of the NOR gate circuit $NOR_1$ becomes "0" to turn transistor $Tr_2$ OFF. Accordingly, the electromagnetic valve 97 is switched to the neutral position to fix the hoist lever 91 at the "lower" position. When the vessel VS descends slightly from the neutral position, limit switch $LS_5$ is turned ON to change signal $E_2$ to "0", thereby returning the engine to idling. Thereafter, vessel VS descends to the "lower" position by its own weight at which limit switch $LS_6$ is turned ON to apply signal "1" to one input of the NAND gate circuit $N_6$. The purpose of delay circuit 107 is to delay the logical operation for a definite time $t$ between a state in which the hoist lever has been driven from the "floating" position to the "upper" position, that is, the hoist lever leaves the "floating" position, and a state at which the limit switch $LS_6$ is turned OFF when the operation of the vessel proceeds so that the input signal to one input of the AND gate circuit $A_4$ is maintained at "0" until a time immediately before turning ON of the limit switch $LS_6$. After time $t$, signal "1" is applied to one input of the AND gate circuit $A_4$. Consequently, this AND gate circuit is enabled to produce signal "0" so that the NOR gate circuit $NOR_1$ produces signal 1 thus turning transistor $Tr_2$ ON. Thus, the solenoid coil 97Sb is energized to again transfer the hoist lever 91 to the "lower" position by the electromagnetic valve 97 thereby setting the hoist lever at the "floating" position. As a result, the limit switches $LS_2$ and $LS_3$ are turned ON to turn transistor $Tr_2$ OFF. Consequently, the electromagnetic valve 97 is switched to the neutral position to set the hoist lever 91 at the "floating" position. In this manner, when the automatic dumping operation is completed, all limit switches $LS_1 - LS_6$ are closed.

Under these conditions dumping operation completion signal $E_3$ is produced, which is masked by a mask circuit 108 for a definite time, five seconds for example, and then applied to the vehicle speed designation circuit 66. If the dumping operation has not been completed yet when signal $E_3$ is produced and if the vehicle is started under such condition, it will be very dangerous. The mask circuit 108 is therefore provided for preventing the vehicle from starting for a definite time after the vessel has lowered to the original position even when signal $E_3$ is produced. When supplied with signal $E_3$, the constant speed running control device 65 controls the dump truck to run in the forward direction at a low speed, 5 km/h for example.

Figure 3:
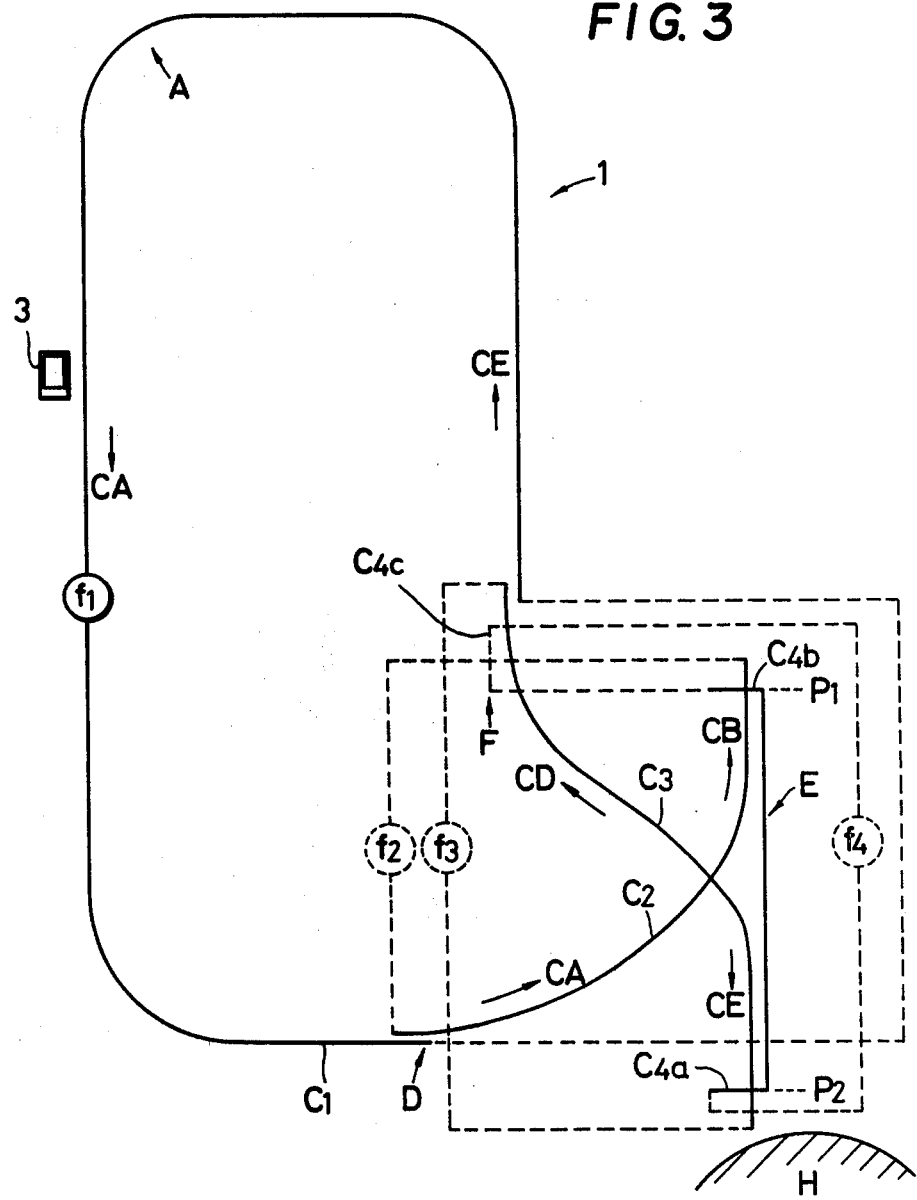
FIG. 3 shows a modified running course.

At this time, since relay $RY_3$ (FIG. 7) has already been energized, the dump truck 3 is controlled to run at a low speed in accordance with signal $f_3$, that is along the induction cable section $C_3$ as shown by arrow CD (FIG. 3). As the dump truck approaches the exit F of the switch back station E, detection coils 40 and 42 detect signals $f_1 - f_4$ to produce signals $e_1 - e_4 =$ "1". As a consequence, flip-flop circuit $FF_4$ is reset to deenergize relay $RY_3$. At the same time flip-flop circuits $FF_1$ and $FF_5$ are reset which were set when the dump truck passed through D as above described whereby relay $RY_1$ is energized to produce a high speed commanding signal $e_h =$ "1". Thus, the dump truck is controlled by signal $f_1$ to run at a high speed of 35 km/h toward the loading station A along the induction cable.

Figure 18:
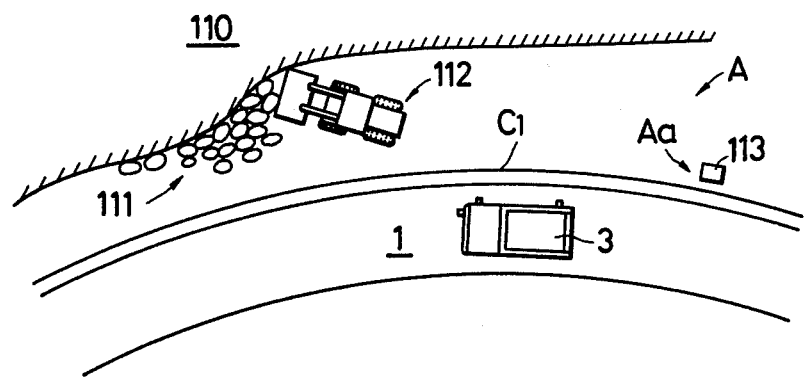
FIG. 18 is a plan view of a mine showing a working face and a loading station.

As shown in FIG. 18, in a mine dynamite is set in a working face 110 and crushed ore 111 is loaded on a dump truck 3 by a loader 112. Usually, the working face is advanced about 10 meters per day, and the distance from one end to the other of the working face is substantial so that the position of the loading station varies in one day. For this reason, it is necessary to vary the stopping position of the dump truck as the working face advances. To vary the stopping position, a transmitter 113 is located at a predetermined position of the loading station A, for example at the nearest position Aa of the working face as shown in FIG. 18 for transmitting signal $f_5$ having a predetermined frequency. A programmed stopping position control device 115 shown in FIG. 19 is mounted on the dump truck 3.

Figure 19:
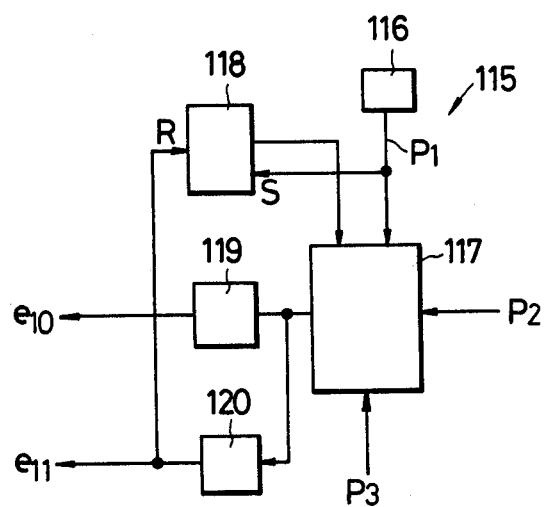
FIG. 19 is a block diagram showing a programmed stop position control device.

As the dump truck 3 passes through position Aa, detector 116 detects a signal $f_5$ to produce a preset pulse $P_1$ which is applied to a down counter 117 and a flip-flop circuit 118 as shown in FIG. 19. When supplied with pulse $P_1$, the flip-flop circuit 118 is set and feeds a clear signal to down counter 117 to render it operable. When pulse $P_1$ is applied, a predetermined preset content $P_2$ is applied to the down counter 117 which is also applied with a distance pulse $P_3$ from a distance pulse generator, not shown, mounted on the vehicle. The distance pulse $P_3$ is generated at each revolution of the wheel, and such a distance pulse generator is well known in the art. Accordingly, it is possible to determine the running distance of the dump truck by counting the number of the distance pulses. The down counter counts down (subtract) the distance pulses $P_3$ from its preset counter for producing a signal corresponding to the content thereof which is applied to comparators 119 and 120. Accordingly, the content of the counter 117 decreases as the wheel rotates. The comparator 119 produces a low speed commanding signal $e_{10} =$ "1" when the content of the counter 117 decreases below a predetermined value and applies this signal to the vehicle speed designation circuit 66 described above thus controlling the dump truck to run at a low speed. As the dump truck continues to run until the content of the down counter 117 becomes zero, the comparator 120 produces a stop commanding signal $e_{11} =$ "1" which is applied to the vehicle speed designation circuit 66 to stop the dump truck 3. At the same time, the flip-flop circuit 118 is reset to produce a clear signal thereby reducing inoperative the down counter 117. In this manner, by selecting a suitable value for the preset signal applied to the down counter 117, it is possible to stop the dump truck at any desired position in the loading station A as the working face 110 advances. For this reason, it is possible to reduce the cycle time by causing the dump truck to pass through position Aa at a high speed, decelerate before the stopping position and stop at the stopping position.

Figure 20:
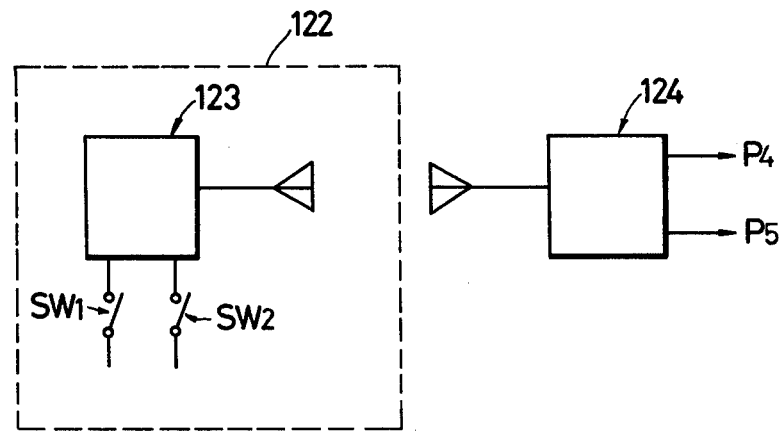
FIG. 20 shows a remote start stop device.
Figure 21:
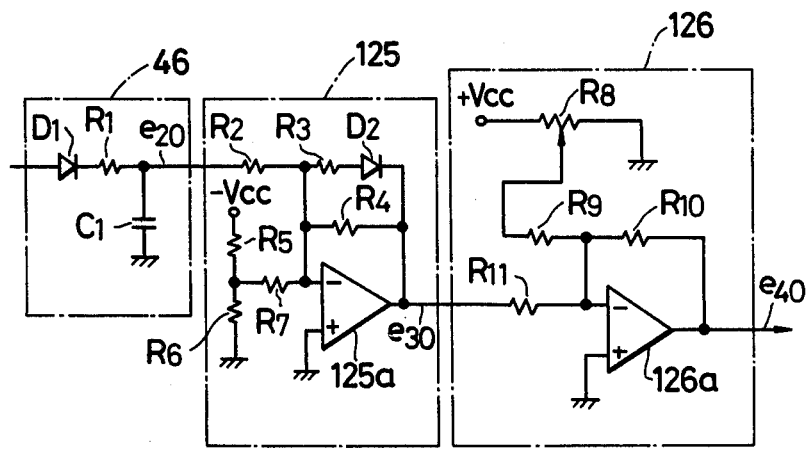
FIG. 21 is a schematic wiring diagram showing a linearizer and a bias circuit.

When loading is completed, an operator closes a start button $SW_1$ of a transmitter 123 mounted on loader 112 of the remote start stop device 122 shown in FIG. 20 for transmitting a start signal. A receiver 124 is mounted on the dump truck and when it receives the start signal it produces a start pulse $P_4$ which is applied to the constant speed running control device 65 for causing the dump truck to run toward the hopper H. A stop switch $SW_2$ is provided for the transmitter 123 for the purpose of enabling the operator to stop the dump truck. When this switch $SW_2$ is closed, the receiver 134 transmits a stop pulse $P_5$ to the running control device 65. In this manner, the operator of the loader 112 can start and stop the dump truck while riding on the loader.

As above described, according to this invention, it is possible to run the dump truck from the loading station to the unloading station or hopper H via the switch back station while controlling its speed, dump the load then return to the loading station while controlling the speed and finally stop at the loading station.

While in the embodiment described above there is only one hopper, where there are a number of hoppers, the number of the induction cables is increased to that of the hoppers and the induction signals are switched to an induction cable corresponding to a specific hopper.

Figure 22:
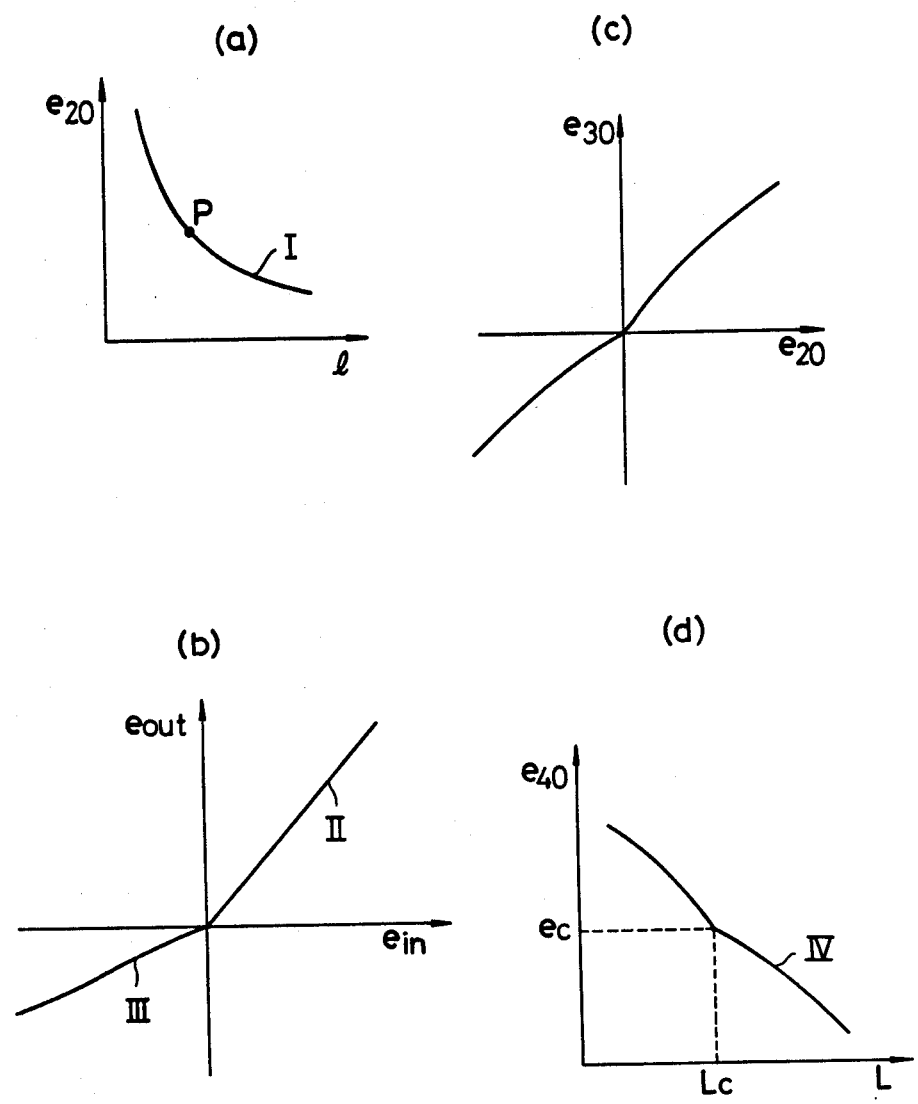
FIG. 22a shows the output characteristic of a detector.
FIG. 22b shows the input/output characteristics of the linearizer shown in FIG. 21.
FIG. 22c shows the output characteristic of the linearizer shown in FIG. 21.
FIG. 22d is a graph showing the relationship between the output of the bias circuit shown in FIG. 21 and the distance between a vehicle and the running course.
Figure 23:
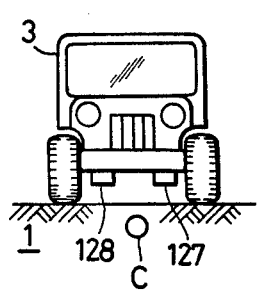
FIG. 23 is a front view of a vehicle guided by an induction cable laid at the center of the running course.
Figure 25:
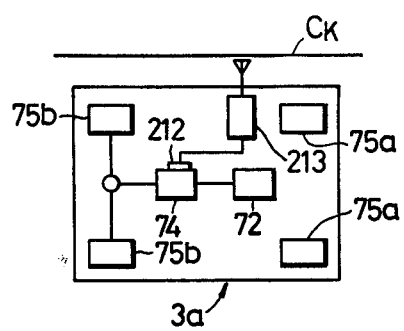
FIG. 25 is a block diagram showing the power system utilized in the embodiment shown in FIG. 24.

The output from the detection coil 40 varies substantially exponentially in accordance with the distance L between it and the induction cable so that the output $e_{20}$ of the detector 46 varies substantially exponentially as shown in FIG. 22a. Such varying signal is not suitable to control steering.

For this reason, a linearizer 125 and a bias circuit 126 are provided for the later stage of the detector 46 so as to obtain a linearly varying signal corresponding to the variation in the distance.

The input-output ($e_{in} - e_{out}$) characteristics of the linearizer 125 is shown by straight lines II and III in FIG. 22b and having different coefficients of amplification $G_2$ and $G_3$ ($G_2 > G_3$). At straight line II, a portion of the signal $e_{20}$ having a small rate of change, for example the portion above point P of curve I shown in FIG. 22a is amplified whereas the portion of the voltage $e_{20}$ having a large rate of change that is the portion below P is amplified at straight line III thus producing an overall output signal having a substantially constant rate of change. The amplification characteristics shown by straight lines II and III in FIG. 22b can be set to suitable values by resistors $R_2 - R_4$ of the linearizer circuit 125. The bias voltage — Vcc for an operational amplifier 125a is set to a suitable value necessary to cause the variation of the signal $e_{20}$ (FIG. 22a) to approach a straight line, that is to a value corresponding to the point of inflection P of curve I (FIG. 22a). These values are matters of circuit design. Consequently, by applying the output signal $e_{20}$ from the detector 46 to the linearizer 125 it is possible to obtain an output signal $e_{30}$ as shown in FIG. 22c having substantially constant rate of change. Since this signal $e_{30}$ is not suitable to set the distance between the induction cable C and the vehicle at a reference value, it is applied to the bias circuit 126 to bias it by a constant value $+Vc$ and then inverted and amplified by the operational amplifier 126a.

Since the signal $e_{20}$ varies depending upon the distance L between the detection coil 40 and the induction cable (FIG. 22a), the relationship between the output signal $e_{40}$ from the bias circuit 126 and the distance L can be represented by a straight line IV having a substantially constant rate of change as shown by FIG. 22d. Thus, a signal which decreases in proportion to the increase in the distance from the induction cable can be obtained.

Assuming now that the vehicle is at substantially the center of the course and that $e_c$ represents the value of the output signal $e_{40}$ of the detection coil 40 which is at a definite distance Lc from the induction cable C, this value can be taken as the reference value of the vehicle for the induction cable. More particularly, should the vehicle deviate from the center of the course to approach the induction cable, the signal $e_{40}$ will become larger than the reference value $e_c$ by $\delta = (e_{40} - e_c)$ and vice versa. Accordingly, when the steering is controlled so as to always decrease to zero the value $\delta$ it is possible to run the vehicle along the center of the running course. Similar circuit may also be used for detector 47.

In the foregoing description, it was assumed that the induction cable is installed on the outside of the course. The induction cable C can however be installed at the center of the course. In this case, a pair of detection coils 127 and 128 are mounted on the vehicle and the difference between the output of the two detection coils is obtained. The steering is controlled to reduce the difference to zero. In this case too, correct course detection can be made by using a linearizer and a bias circuit in the same manner as above described.

Figure 24:
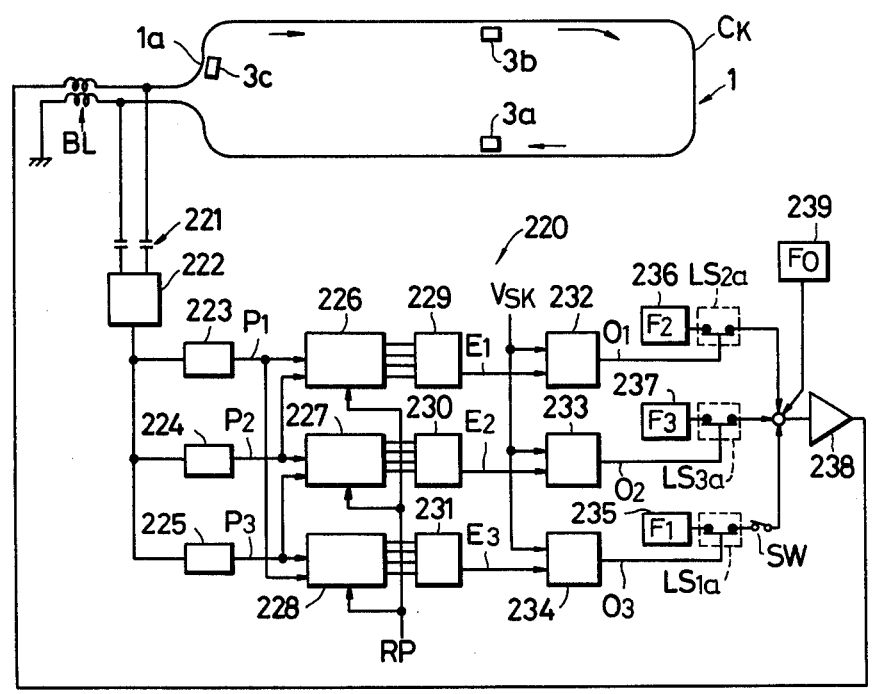
FIG. 24 is a block diagram showing one example of a collision prevention circuit.

FIG. 24 shows one example of a vehicle collision prevention circuit utilized in the control system of this invention. For the sake of simplicity, the running control system is omitted.

In FIG. 24, an induction cable Ck is installed along the running course 1 and an induction signal Fo having a frequency of several hundreds kHz is normally applied to the induction cable from an oscillator 239 via an amplifier 238 and a blocking coil BL. Along the running course are shown three no-man vehicles 3a - 3c.

Figure 27:
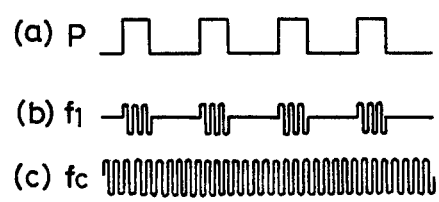
FIG. 27 is a graph useful to explain the operation of the power system shown in FIG. 25 and the frequency modulator shown in FIG. 26 and FIGS. 28a and 28b show graphs useful to explain the relationship between the comparator output and the vehicle speed.

Similar to the previous embodiment, the vehicle 3a is provided with a detection coil for detecting the induction signal Fo and a running control system for controlling the speed etc. of the vehicle in accordance with the output of the detection coil. The power of an engine 72 is transmitted to rear wheels 75b via a transmission gearing 74. A vehicle speed detector 212 is mounted on the transmission gearing for producing one pulse signal P (FIG. 27a) for a running distance of 1m which is applied to a transmitter 213. The frequency of the pulse P is proportional to the vehicle speed.

Figure 26:
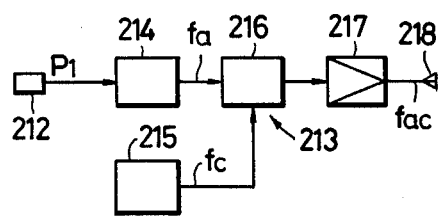
FIG. 26 is a block-diagram showing a frequency modulator.

As shown in FIG. 26, an oscillator 214 produces a signal $fa$ (FIG. 27b) having a predetermined frequency in response to input pulse P and the signal $fa$ is applied to a frequency modulator 216 which modulates the carrier frequency $fc$ (FIG. 27c) produced by an oscillator 215 with signal $fa$ and the output $fac$ of the frequency modulator is transmitted from antenna 218 via an amplifier 217. The no-man vehicles 3b and 3c are constructed similarly, thus transmitting modulated signals $fbc$ and $fcc$ respectively. These vehicles 3a - 3c are steered by the induction signal Fo and their runnings are controlled by the induction signals $F_1$, $F_2$ and $F_3$ respectively. The detection coil of the vehicle 3a simultaneously detects induction signals $F_0$ - $F_3$ and applies them to its running control systems. The same is true for the other vehicles 3b and 3c. A central control device 220 (FIG. 24) is installed at a definite position on the ground.

At first, three no-man vehicles are stopped in the order of 3a, 3b and 3c at the starting point 1a of the running course.

When a main switch SW(FIG. 24) is closed, induction signal $F_1$ generated by oscillator 253 and superposed upon induction signal Fo is impressed upon the induction cable Ck via relay contact $LS_{1a}$. In response to signal $F_1$, the vehicle 3a starts. Relay contacts $LS_3$ - $LS_1$ are opened when supplied with output signals $C_{1a}$ - $C_{3a}$ from Schmitt trigger circuit 232 - 234 and vice versa. The Schmitt trigger circuits are provided to set desired vehicle spacings and operate to generate signals $C_1$ - $C_3$ when the intervehicle distance signals $E_1$ - $E_3$ produced by digital-analogue converters 229 - 231 are smaller than a preset distance value $V_{sk}$. Consequently, when the vehicle 3a starts, the distance between vehicles 3a and 3c is larger than the preset distance value so that only contact $LS_{1a}$ is closed and relay contacts $LS_{2a}$ and $LC_3$ are opened. Consequently, the induction signals $F_2$ and $F_3$ produced by oscillators 236 and 237 are not applied to the induction cable Ck so that vehicles 3b and 3c are stopped.

When the vehicle 3a starts, transmitter 213 mounted thereon transmits the modulation signal $fac$ through antenna 218. The control device 220 receives this signal $fac$ by utilizing the induction cable as the receiving antenna. The received signal $fac$ is applied to tone decoders 223 - 235 through a coupling capacitor 221 and a filter-amplifier 222. The tone decoders 223 - 235 select modulation signals $fac$ - $fcc$ simultaneously received by the induction cable thus producing pulse signals $P_1$ - $P_3$ corresponding to signals $fa$ - $fc$ respectively. As a consequence, the tone decoder 223 produces a pulse signal $P_1$ which is the same as that shown in FIG. 27a. This pulse $P_1$ is applied to the up down counter 226 of the vehicle 3a as an up pulse and to the up down counter 228 of vehicle 3c as a down pulse.

As the vehicle 3a runs, the count of the counter 226 increases and its output is converted into DC voltage $E_1$ by D - A converter 229 and then applied to Schmitt trigger circuit 232. The output signal $E_1$ corresponds to the distance between vehicles 3a and 3b. The Schmitt triger circuit 232 compares signal $E_1$ with the set value Vsk of the intervehicle distance and its output signal $C_1$ becomes 0 when signal $E_1$ reaches the level of the set value Vsk. Accordingly, relay contact $LS_{2a}$ is closed to apply the induction signal $F_2$ from the oscillator 236 to the induction cable via amplifier 238 together with signals $F_0$ and $F_1$. The vehicle 3b starts in response to this signal $F_2$. In other words, when the spacing between vehicles 3a and 3b exceeds a predetermined value, succeeding vehicle 3b is started.

As the vehicle 3b starts, it generates a modulation signal $fbc$ and the control device simultaneously receives modulation signals $f_{ac}$ and $f_{bc}$. In response to the modulation signal $f_{bc}$, the tone decoder 224 produces a pulse signal $P_2$ which is applied to the up down counter 227 of the vehicle 3b as an up pulse and to the up down counter 226 as a down pulse.

When the speed of the succeeding vehicle 3b is higher than that of the preceding vehicle 3a, the count of the counter 226 decreases. When the output signal $E_1$ of the D - A converter 232 decreases below the set value $V_{sk}$, the Schmitt trigger circuit 232 produces signal $O_1$ thus opening relay contact $LS_{2a}$. Accordingly, induction signal $F_2$ is no longer applied to the induction cable thus stopping the vehicle 3b. When the distance between vehicles 3a and 3b exceeds a preset value, the vehicle 3b is started again.

As the vehicle 31 runs, the count of the counter 227 increases and D-A converter 230 produces a corresponding signal $E_2$. When signal $E_2$ reaches set value Vsk, the Schmitt trigger circuit 233 stops generation of signal $O_2$ thereby closing relay contact $LS_{3a}$. The oscillator 237 applis induction signal $F_3$ to induction cable together with induction signals $F_0$, $F_1$, $F_2$. In response to signal $F_3$ vehicle 30 is started.

As the vehicle 3c starts, it produces modulation signal fcc so that control device 220 will simultaneously receive modulation signals fac - fcc. The tone decoder 225 produces pulse signal $P_3$ thus counting up counter 228 and counting down counter 227.

As above described, vehicles 3a - 3c are sequentially started with a predetermined intervehicle distance.

When the speed of the preceding vehicle 3a is higher than that of the last vehicle 3c, the count of the counter 228 decreases. When the output signal $F_3$ from the D - A converter 231 decreases below the set value Vsk, the Schmitt trigger circuit 234 produces an output $O_3$ to open relay contact $LS_{1a}$. As a result, the induction signal $F_1$ is not applied to the induction cable, thus stopping vehicle 3a. In this manner, as the intervehicle distance decreases below a preset value, succeeding vehicles are stopped to prevent collision.

As a comparator, a Schmitt trigger circuit having a hysteresis is used whereby the succeeding vehicle is stopped only upon entering by a small predetermined distance within the preset distance and started only upon moving by a small predetermined distance away from the preset distance. This prevents too frequent starting and stopping of the succeeding vehicle when the speed of the preceding vehicle varies slightly. Counters 226 and 227 are cleared by a reset pulse when the vehicles return to the starting point 1a.

What is claimed is:

1. A no-man control system for a working vehicle comprising an induction cable installed along a predetermined running course between a loading station and an unloading station, a detection coil mounted on said working vehicle to detect current flowing through said induction cable, a steering control device responsive to the signal detected by said detection coil for steering said working vehicle to run along said cable, vehicle position detection means for detecting the position of said vehicle when it reaches a predetermined position, a vehicle speed commanding device responsive to the output of said vehicle position detection means for accelerating and decelerating the vehicle, a vehicle speed control device for controlling the vehicle speed in accordance with the difference between a speed commanded by said vehicle speed commanding device and an actual vehicle speed thereby controlling said vehicle to run along said predetermined running course between said loading and unloading stations, and a switch back station near said unloading station, a substantially triangular running course being formed in said switch back station and having apices at an entrance and exit position, a reverse position and an unloading position, respectively.

2. The no-man control system according to claim 1 which further comprises a vehicle detection device for detecting that the vehicle has reached the entrance and exit position, the reverse position, and the unloading position respectively, a first induction cable section extending between the entrance position and the reverse position, a second induction cable section extending between the reverse position and the unloading position, a third induction cable section extending between the unloading position and the exit position, a transfer switch responsive to the output of said vehicle detection device which is produced as the vehicle runs for sequentially selecting and energizing one of said induction cable sections, and means for running said vehicle in the reverse direction between said reverse position and said unloading position whereas in the forward direction in the other sections.

3. No-man control system according to claim 1, which further comprises a vehicle detection device for detecting that the vehicle has reached the entrance and exit position, the reverse position, and the unloading position respectively, a first induction cable extending between the entrance position and the reverse position, a second induction cable extending between the reverse position and the unloading position, a third induction cable extending between the unloading position and the exit position, a fourth induction cable extending between said entrance position and said exit position via said loading station, said first to fourth induction cable being installed to partially overlap each other, means for applying signals having different frequencies to respective induction cables, means responsive to the output of said vehicle detection device for selecting a signal having a predetermined frequency among signals having said different frequencies and detected by a detection coil mounted on the vehicle to act as a vehicle steering control signal, and means for controlling the vehicle to run in the reverse direction only between the reverse position and the unloading position and to run in the forward direction along the other sections.

4. The no-man control system according to claim 1 which further comprises a linearizer circuit for converting the output from said detection coil into a signal proportional to the distance between said induction cable and said vehicle.

5. The no-man control system according to claim 1 which further comprises means for simultaneously passing induction signals having different frequencies respectively corresponding to different vehicles through said induction cable, a control device mounted on each vehicle for starting the same when detecting coils mounted on respective vehicles begin to detect induction signals having frequencies corresponding to respective vehicle and for stopping said vehicles when said detecting coils do not detect said signals, means for detecting the distance between respective vehicles and an ON-OFF control device for passing and interrupting said induction signals.

6. The no-man control system according to claim 5 wherein said distance detecting means comprises a transmitting device mounted on each vehicle for producing a modulation signal having a specific frequency corresponding to each vehicle at each definite distance, means to receive and demodulate the signals from the transmitting devices via said induction cable for producing pulse signals, and means responsive to said pulse signals for counting up up-down counters corresponding to respective vehicles, and for counting down up-down counters for preceding vehicles, said ON-OF control device interrupting the induction signals having frequencies corresponding to respective vehicles from said induction cable when the counters of the up-down counters increase below predetermined values whereas applying said induction signals to said induction cable when said counts exceed predetermined values.

7. The no-man control system according to claim 1 which further comprises means for detecting the fact that said difference between the commanded vehicle speed and the actual vehicle speed has exceeded a preset value when said difference designates vehicle deceleration and a retarder controlled by said detecting means.

8. The no-man control system according to claim 1 wherein said vehicle comprises a dump truck and said control system further comprises an automatic dumping control device which dumps said dump truck at the unloading station.

9. The no-man control system according to claim 8 wherein said automatic dumping control device comprises a hoist cylinder connected to a hoist lever of the dump truck for controlling the position of said hoist lever in accordance with the position of a switching electromagnetic valve, means for detecting the position of said hoist lever for producing a signal corresponding to said position, means linked with a vessel of said dump truck for detecting the position of said vessel to produce a signal corresponding to said position, an engine speed detector for producing a signal corresponding to a speed of said engine, a motor for driving an acceleration pedal and a control device for actuating said hoist cylinder, said control device being responsive to said hoist lever position signal, said engine speed signal and said vessel position signal for controlling the engine speed through said motor when said electromagnetic valve and said vessel are at predetermined positions.

* * * * *